Jan. 10, 1956   R. A. BEACH   2,729,988
INDEXING DEVICE FOR CHAIN SAW SHARPENER
Filed May 5, 1954   3 Sheets-Sheet 1
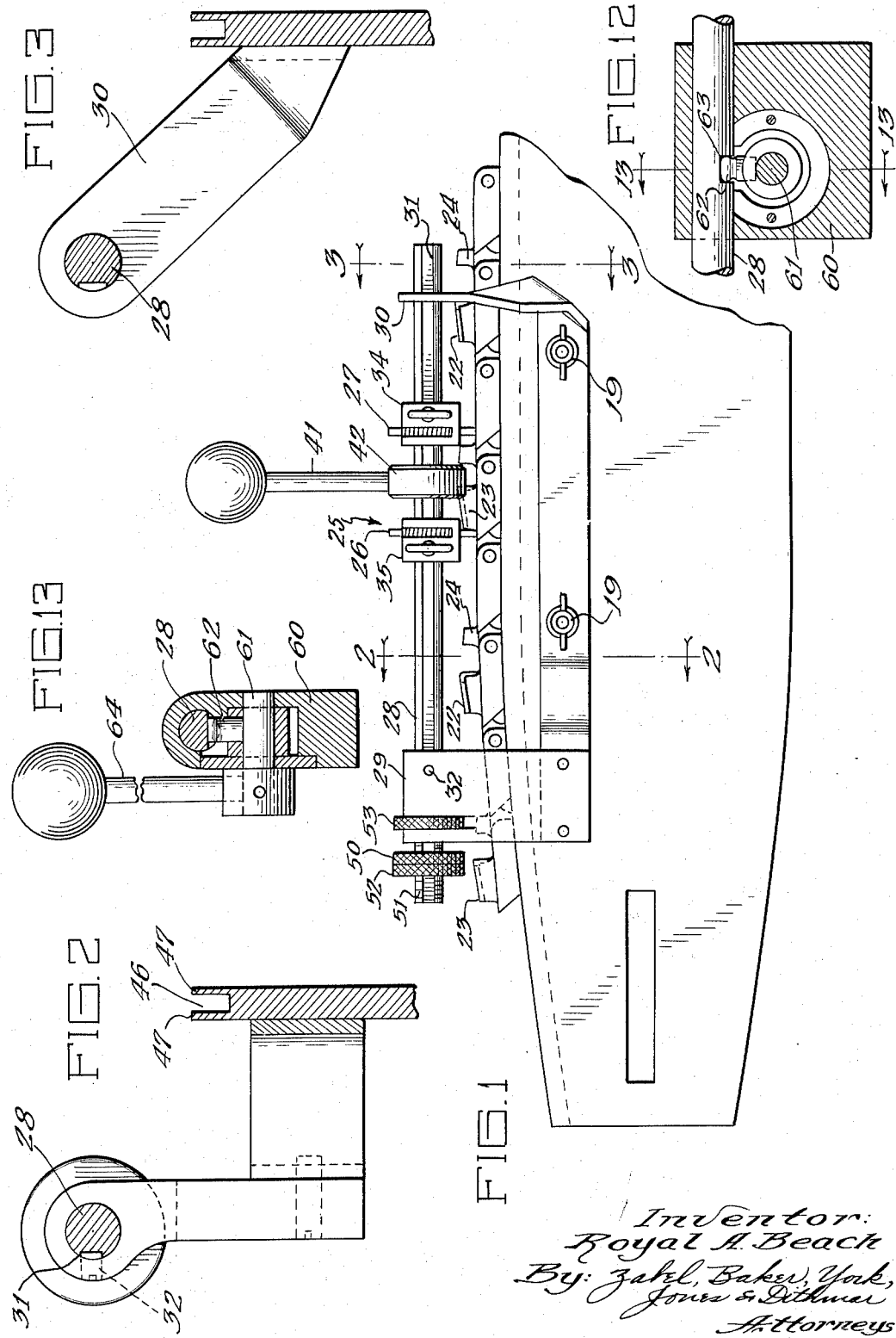
Inventor:
Royal A. Beach
By: Zahl, Baker, York,
Jones & Dithmar
Attorneys Jan. 10, 1956
R. A. BEACH
2,729,988
INDEXING DEVICE FOR CHAIN SAW SHARPENER
Filed May 5, 1954
3 Sheets-Sheet 2
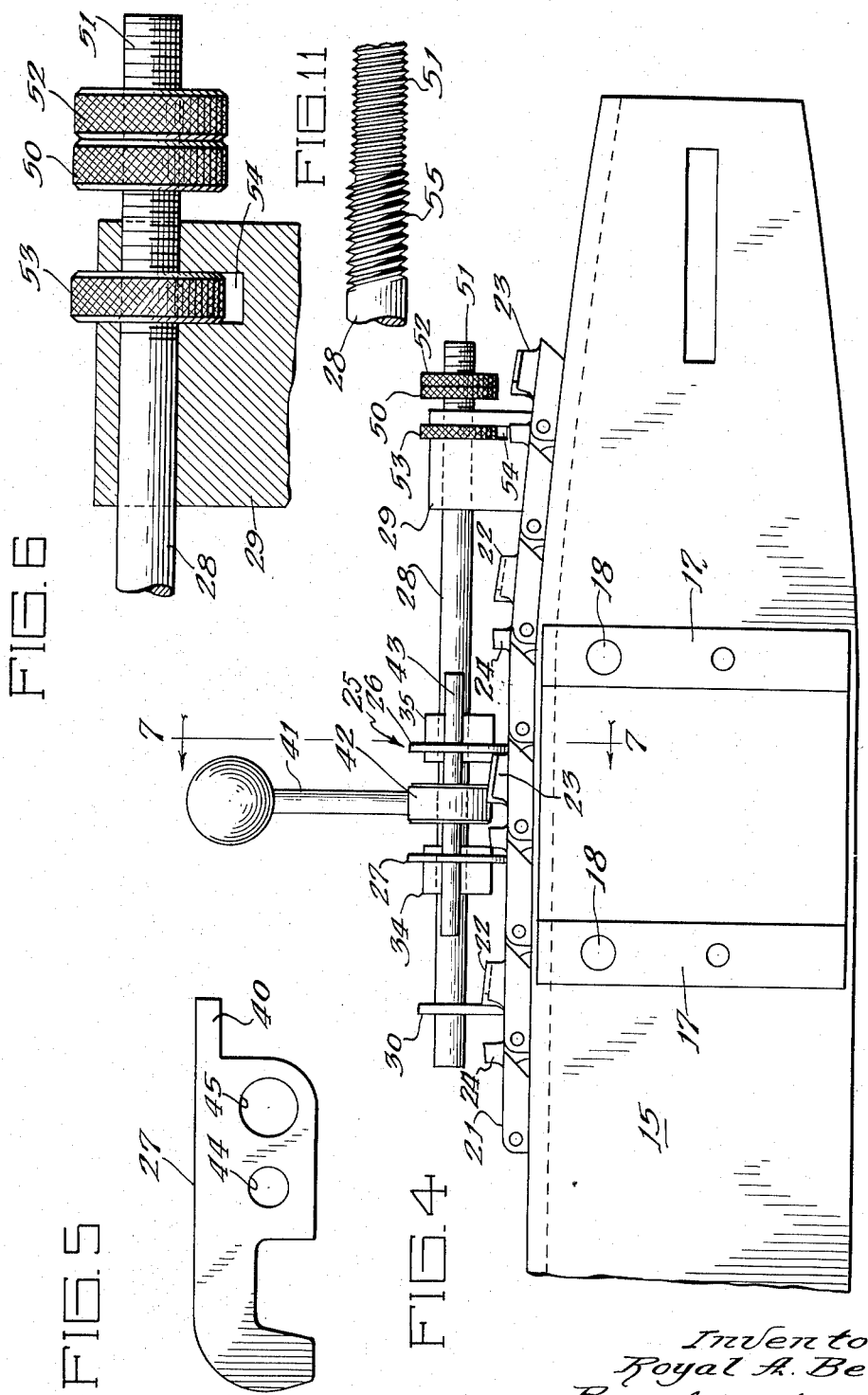
Inventor:
Royal A. Beach
By: Zahrl, Baker, York,
Jones & Dithmar
Attorneys

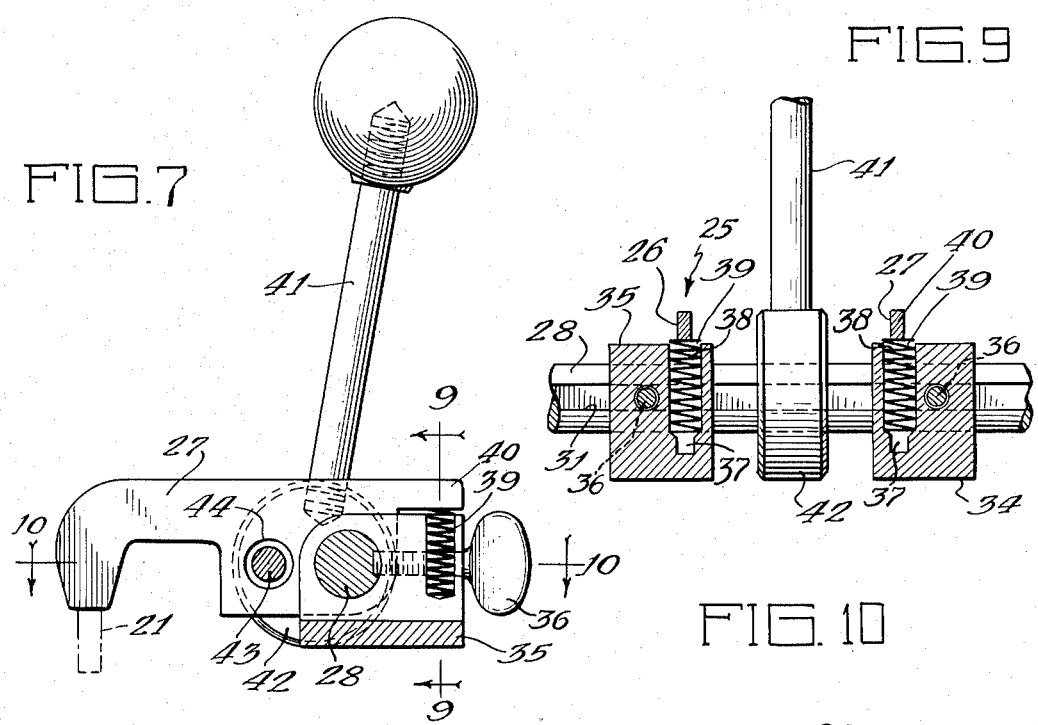
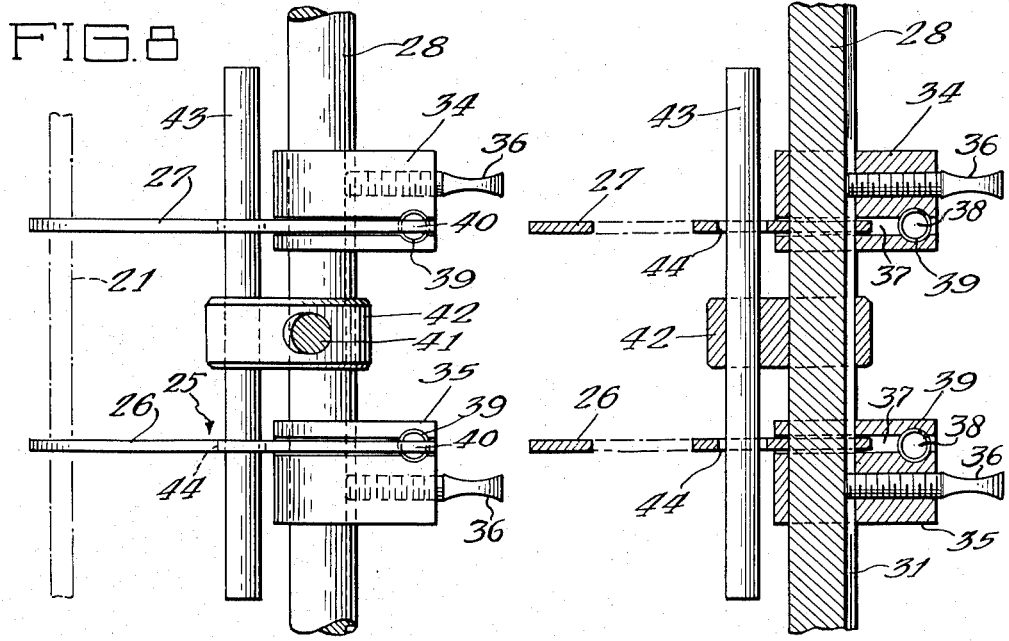

United States Patent Office 2,729,988
Patented Jan. 10, 1956

2,729,988

INDEXING DEVICE FOR CHAIN SAW SHARPENER

Royal A. Beach, Racine, Wis., assignor to The Dumore Company, Racine, Wis., a corporation of Wisconsin Application May 5, 1954, Serial No. 427,704

9 Claims. (Cl. 76—77)

This invention relates to an indexing device for a chain saw sharpener.

The present invention is particularly adapted for use with a chain saw sharpener of the type shown in co-pending application Serial No. 297,510, filed July 7, 1952, by Gary G. Bluemink. In that application, there is shown a chain saw of the router type, so-called because the cutter teeth are in the form of two series of routers, a left-hand series, and a right-hand series. The top surface of a cutter tooth of this type slopes downwardly and rearwardly. The cutting edge has a cylindrical surface. Hence, a deep grind will reduce the height of the tooth. When the teeth are of non-uniform height, some of the saw teeth do not cut, and the saw stutters and jumps and is very hard to hold.

It is an object of this invention to provide an indexing device by means of which a uniform depth of grind may be provided on all of the teeth of the series, thus providing teeth of uniform height.

The present invention provides mounting bracket means which supports a shaft arranged parallel to the saw blade. An indexing member is mounted on the shaft against which the rear edge of a cutter tooth can be positioned while the front edge of the tooth is ground.

A further object of the invention is to provide an improved indexing device of the type indicated in which the position of the indexing member can be adjusted with great accuracy so as to secure the proper depth of cut, and at the same time to provide feeding means which permits the indexing member to be backed off so that the cut can be made in successive increments, or passes of the grinding wheel which forms a part of the chain saw sharpener.

In this connection, adjusting means are provided to regulate the position of the shaft with respect to its supporting means, but the parts are so arranged that this adjusting means provides a limiting position. The feeding means cooperates with the adjusting means so that the shaft can first be backed off to accommodate an unground tooth, and can then be advanced, in successive increments, up to the limiting position.

When one tooth of a series is severely nicked, then that tooth requires a deep grind and consequently all the other teeth of the series must be ground to the same depth. The foregoing arrangement permits the indexing device to be set at the proper depth of cut for the worst tooth, and permits this setting to be maintained for all of the remaining teeth, even though the position of the indexing member must be shifted in connection with the grinding of another tooth in successive increments.

Another object is to provide an indexing device in which the indexing member is in the form of a clamp arm which presses down on the tooth to be ground with a substantial and a uniform pressure, thereby avoiding such differences in tooth elevation, with respect to the sharpener, as would result in a non-uniform grind.

A still further object is to provide an indexing device having a pair of such clamp arms, each of which acts independently of the other, to the end that both the front and rear of the particular link which carries the cutter tooth may be pressed downwardly with a substantial and uniform pressure.

Still another object is to provide an indexing device which may be readily mounted on the saw blade, and which, after mounting, can be adjusted for indexing either the right or left-hand series of teeth, without removing the indexing device from the saw blade.

Other objects, features and advantages will become apparent as the description proceeds.

With reference now to the drawings, in which like reference numerals indicate like parts:

Fig. 1 is a rear elevation of the blade of a chain saw, showing a preferred embodiment of my invention mounted thereon;

Fig. 2 is a vertical section taken along line 2—2 of Fig. 1 showing the main shaft support;

Fig. 3 is a vertical section taken along line 3—3 of Fig. 1 showing the bent end of the bracket which serves as an auxiliary shaft support;

Fig. 4 is a front elevation of the saw blade and indexing device;

Fig. 5 is a detailed elevation of a clamp arm;

Fig. 6 is a vertical section through the main shaft support, taken along line 6—6 of Fig. 2;

Fig. 7 is a vertical section taken along line 7—7 of Fig. 4;

Fig. 8 is an enlarged plan view of the clamp arms and their associated parts;

Fig. 9 is a vertical section taken along line 9—9 of Fig. 7;

Fig. 10 is a horizontal section taken along line 10—10 of Fig. 7;

Fig. 11 is a view of the shaft, similar to that shown in Fig. 6, but showing a modified form thereof;

Fig. 12 is a view similar to Fig. 6 but showing a modified form of feeding means, and Fig. 13 is a vertical section taken along line 13—13 of Fig. 12.

With reference now to Figs. 1 and 4, the reference numeral 15 designates the blade of a chain saw, and the reference numeral 16 designates the indexing device generally. A mounting plate 17 for the sharpener is secured to the blade 15 by means of bolts 18 and wing nuts 19, the bolts also passing through a bracket 20 which forms a part of the indexing device. Thus, the indexing device and the sharpener are positively mounted on the saw blade by common means. It can be pointed out that saw blades of this type are customarily provided with holes to accommodate the bolts 18 of a sharpener.

The saw blade 15 is provided with a groove 46 which accommodates a chain 21, the latter being made up of a series of right-hand cutter teeth 22, a series of left-hand cutter teeth 23, and a series of gauge teeth 24, which are connected by suitable links, as pointed out in the above-mentioned co-pending application. The cutter teeth themselves ride upon the edges 47, shown in Fig. 2 as being disposed on either side of the groove 46.

The indexing device includes an indexing member designated generally by the reference numeral 25 which is carried on a shaft 28. The shaft 28 is mounted at one end in a bearing 29 and it is supported at the other end by the bent end 30 of the bracket 20. The bearing 29 is in the form of a block having a longitudinal bore for slidably receiving the shaft 28, and the bearing is of substantial length so as to provide a firm cantilever support for the shaft.

In the particular arrangement shown, the indexing member 25 is rotatably mounted on the shaft 28, and the shaft 28 is non-rotatably mounted in the bearing 29. To this end, the shaft is provided with a keyway 31 which is engaged by a set screw 32 in the bearing 29, as shown in Figs. 1 and 2, to secure the shaft against rotation.

The indexing member 25 provides means against which the rear edge of a cutter tooth can be positioned while the front edge of the tooth is ground, and as shown in Figs. 7 and 8, the indexing member is in the form of a clamp arm 26. Means are provided to urge the clamp arm downwardly so as to press the cutter tooth against the edge 47. A second clamp arm 27 is provided for pressing down on an adjacent link, so that the front of the cutter tooth will also be pressed downwardly against the edge 47.

Clamp arms 26 and 27 are mounted on the shaft 28 by means of slide blocks 34 and 35, respectively, which are adjustably secured to the shaft 28 by thumb screws 36. The thumb screws engage the keyway 31 so that the slide blocks 34 and 35 are non-rotatably secured to the shaft 28.

The slide blocks 34 and 35 are of identical construction, except with respect to right- and left-handedness, so that a description of one will suffice for the other. As shown in Figs. 7–10, the block 35 is provided with a slot 37 which is enlarged by a bore 38 which accommodates a spring 39. Both the block and the clamp arm are provided with a suitable bore to accommodate the shaft 28 so that the clamp arm may be positioned within the slot 37. This bore or opening in the clamp arm 27 is indicated by the reference numeral 45, in Fig. 5. As shown in Fig. 5, the clamp arm is provided with a tail 40 and the spring 39 is confined between the bottom of the bore 38 and the tail 40. Thus, the forward end of each clamp arm is urged downwardly against the chain 21 by the springs 39.

Means are provided to raise the clamp arms 26 and 27 against the bias of the springs 39. This means comprises a handle 41, in the form of an arm, which is secured at one end to a hub 42 which is rotatably mounted on the shaft 28. Mounted transversely in the hub, and parallel to shaft 28, is a short shaft or rod 43 which extends through openings 44, as shown in Fig. 5, in the clamp arms 26 and 27. As shown in Fig. 7, the openings 44 are of somewhat greater diameter than the rod 43 so as to permit relative movement between the clamp arms 26, 27, and the rod 43. Thus each clamp arm may be urged downwardly by its respective spring 39, independently of the other clamp arm.

Thus, after the rear edge of one tooth has been positioned against the clamp arm 26, and the tooth has been ground, then by rotating the handle 41 in clockwise direction, as shown in Fig. 7, the clamp arms 26 and 27 may be elevated so that the position of the chain may be shifted to bring another tooth into position. However, during the grinding operation, each clamp arm is independently pressed down with a substantial force, thus urging the particular link, on which the cutter tooth is formed, downwardly into firm engagement with the edge 47 of the saw blade 15.

The depth of the cut adjustment comprises a stop nut 50 which engages threads 51 formed on the end of the shaft 28. The stop nut is adapted to abut the end of bearing 29 thus providing means for regulating the position of the shaft 28, and the indexing member 25, with great accuracy. A lock nut 52 is provided so that this setting may be maintained. Thus the stop nut 50 comprises an adjusting means for adjusting the axial position of the shaft with respect to the bearing, and hence the position of the indexing member with respect to the saw blade, and this is the adjusted position which is effective during the final pass of a series of passes.

However, as pointed out above, feeding means are provided in addition to the adjusting means so that the whole shaft assembly, including shaft 28, stop nut 50, and indexing member 25, may be shifted to the right, as shown in Figs. 4 and 6, without interfering with the setting of the adjusting means, or stop nut 50. Thus the stop nut 50 is backed away from the bearing 29, into a position from which the shaft can be fed forwardly between successive passes, until such time as the adjusting means, or stop nut 50, engages the bearing 29, this being the final position which determines the depth of cut. This feeding means comprises a feed nut 53 which is disposed in a slot 54 formed in the bearing 29. The feed nut engages the threads 51, and since the shaft 28 is restrained from rotation by means of the set screw 32, rotation of the feed nut 53 will cause sliding movement of the shaft and its associated parts.

Although the feed nut 53 cooperates with the threads of shaft 28, the shaft 28 may be formed with a separate lead thread 55, in addition to the threads 51, to facilitate the feeding operation, as shown in Fig. 11.

Thus, by manipulation of the feeding nut 53, the shaft 28 and the indexing member 25 may be backed off sufficiently to accommodate an unground tooth. Then, the shaft 28 is advanced by successive steps, each step representing a separate pass of the grinding wheel, until the maximum depth of cut, as determined by the setting of the stop nut 50, is reached.

A modified feeding device is shown in Figs. 12 and 13, in which the shaft 28 is received in a bearing 60. A stub shaft 61 is journaled in the bearing 60 below the shaft 28, and carries a pin 62 which engages a slot 63 formed in shaft 28. A lever 64 is connected to the shaft 61, and it will be seen that movement of the lever will advance or retract the shaft 28, in the same manner as described above in connection with the feed nut 53.

To summarize the operation, which has previously been detailed in connection with the description of various parts and sub-assemblies, when a saw is to be sharpened, the indexing device 20 and the mounting plate 17 of the sharpener are mounted on opposite sides of the saw blade 15 by means of the bolts 18 and the wing nuts 19.

The general position of the indexing member 25 is first obtained by the coarse adjustment provided by the sliding relationship of the slide block 34 and the shaft 28, and by the set screws 36.

This general position is determined by the angle between the axis of the grinding wheel and the plane of the saw blade, and, of course, this angle is reversed for teeth of the opposite series, thus requiring a very substantial shift in this general position.

The indexing member 25 comprises the clamp arm 26 which is forced down by the spring 39 with a substantial pressure so that the bottom of the cutter tooth link will rest firmly against the edges 47 adjacent the groove 46. The second clamp arm 27 is provided to press down similarly on the forward end of the cutter tooth link, or on an adjacent link, so that the cutter tooth link will lie flat on the edge 47 and at a predetermined elevation which is uniform with the elevation of all of the other cutter tooth links of the series.

The intended method of grinding, when this indexing device is used, is by feeding the grinding wheel axially into the tooth, referred to herein as a pass. The feed nut 53, prior to a given pass, is rotated to bring the indexing member 25 into such position that the desired amount of metal will be removed on that pass.

For instance, assume that a particular tooth series contains a severely nicked tooth. This tooth is ground by successive passes until the nick is eliminated. Then, the stop nut 50 and the lock nut 52 are screwed up against the bearing 29, and this setting determines the maximum depth of cut for all of the remaining teeth of that series.

Then, the handle 41 is operated to retract the clamp arms 26 and 27 so that the next tooth can be brought into position. Since the grinding of this tooth will presumably require several passes, the shaft 28 is first backed off, by means of the feed nut 53 or the lever 64, as outlined above, and then the tooth is ground.

This sequence of operations is repeated until every tooth of the series has been ground. Since the depth of cut, with respect to the rear edge of the tooth, is identical for each tooth, due to the setting of the stop nut 50, the teeth will all be of uniform height.

In the event that no one tooth is severely nicked, and the teeth are otherwise of equal length, it may be that a single pass of the grinding wheel may be sufficient. In this event, of course, no manipulation of the feeding means will be required after the initial setting of the stop nut 50 has been obtained.

For grinding the opposite cutter tooth series, the steps are repeated. However, a micrometer may be used to secure uniformity of tooth length as between the two series of teeth, and the stop and lock nuts 50, 52 can be set accordingly. This setting may be made initially, as outlined in connection with the grinding of a severely nicked tooth, on the first tooth of the opposite series to be ground, and the setting is maintained for all the remaining teeth.

Thus, both series of teeth may be indexed and ground without removing the indexing device from the saw blade.

Although I have described only preferred embodiments of my invention, it will be understood that various modifications and changes may be made in the constructions shown and described herein without departing from the spirit of my invention as claimed below.

I claim:

1. An indexing device for a chain saw sharpener comprising a shaft, an indexing member carried by said shaft, means for mounting said shaft parallel to a saw blade, said means including a bearing, means for adjusting the axial position of said shaft with respect to said bearing, means engaging said shaft for feeding the same back and forth in an axial direction, said adjusting means providing a limiting position in one direction to limit the feeding of said shaft in that direction and comprising a stop member adjustably mounted on said shaft for engagement with one portion of said bearing, and said feeding means comprising a feed nut threaded onto said shaft and engaging another portion of said bearing, and means keying said shaft against rotation with respect to said bearing whereby rotation of said feed nut will shift the axial position of said shaft.

2. An indexing device as claimed in claim 1 in which said indexing member comprises an arm rotatably mounted on said shaft for movement into and out of tooth engaging position.

3. An indexing device for a chain saw sharpener comprising a shaft, an indexing member carried by said shaft, means for mounting said shaft parallel to a saw blade, said means including a bearing, means for adjusting the axial position of said shaft with respect to said bearing, means engaging said shaft for feeding the same back and forth in an axial direction, said adjusting means providing a limiting position in one direction to limit the feeding of said shaft in that direction and comprising a stop member adjustably mounted on said shaft for engagement with said bearing, said bearing being slotted, said shaft being provided with a screw thread, and said feeding means comprising a feed nut disposed in said slot and engaging said screw thread, means keying said shaft against rotation with respect to said bearing whereby rotation of said feed nut will shift the axial position of said shaft, said indexing member comprising a clamp arm rotatably mounted on said shaft, means keyed to said shaft at a point adjacent said clamp arm, and resilient means bearing on said clamp arm and on said last-mentioned means for urging the outer end of said clamp arm downwardly against the chain of a chain saw disposed on said saw blade.

4. An indexing device for a chain saw sharpener comprising a bracket adapted to be secured to a saw blade, a shaft disposed substantially parallel to said saw blade and spaced in a lateral direction from the cutter teeth thereof, a bearing carried by said bracket and supporting said shaft at one end thereof, a clamp arm mounted on said shaft for rotation with respect to said bearing, said clamp arm having a portion normally positioned above one of said cutter teeth, means for causing said clamp arm to press downwardly on a cutter tooth link of a saw chain to urge said link against the edge of said saw blade and to provide a stop against which the rear edge of said cutter tooth can be positioned during the grinding of the front edge thereof, said bearing being provided with a bore through which said shaft extends, and being provided with a slot perpendicular to said bore and intersecting the same, key means to prevent rotation of said shaft with respect to said bearing, a screw thread on said shaft, and a feed nut disposed within said slot and engaging said screw thread whereby rotation of said nut will feed said shaft in an axial direction.

5. An indexing device as claimed in claim 4 including a stop nut mounted on said shaft at the opposite side of said bearing from said block, whereby said stop nut provides a stop to limit the extent of feed provided by said first-mentioned nut.

6. An indexing device for a chain saw sharpener comprising a bracket adapted to be secured to a saw blade, a shaft disposed substantially parallel to said saw blade and spaced in a lateral direction from the cutter teeth thereof, a bearing carried by said bracket and supporting said shaft at one end thereof, a block mounted on said shaft, means securing said block to said shaft, a clamp arm carried by said block and having a portion normally positioned above one of said cutter teeth, said clamp arm being mounted on said shaft for rotation with respect to said bearing, and means for causing said clamp arm to press downwardly on a cutter tooth link of a saw chain to urge said link against the edge of said saw blade and to provide a stop against which the rear edge of said cutter tooth can be positioned during the grinding of the front edge thereof.

7. An indexing device as claimed in claim 6 in which said block is provided with a slot, said clamp arm being disposed within said slot and being pivoted on said shaft, and said means for causing said clamp to press downwardly on a cutter tooth link comprising a spring disposed in said slot and bearing against a portion of said clamp arm.

8. An indexing device as claimed in claim 7 including a hub member rotatably mounted on said shaft adjacent said block, a handle for said hub member, and means carried by and projecting from said hub member and engaging said clamp arm for rotating the same upwardly against the bias of said spring.

9. An indexing device for a chain saw sharpener comprising a bracket adapted to be secured to a saw blade, a shaft disposed substantially parallel to said saw blade, a bearing carried by said bracket and supporting said shaft at one end thereof, two spaced blocks slidably mounted on said shaft, means keying said blocks to said shaft, a clamp arm carried by each block, said clamp arms being rotatably mounted on said shaft, means for causing one of said clamp arms to press downwardly on a cutter tooth link of a saw chain to urge said link against the edge of said saw blade and to provide a stop against which the rear edge of said cutter tooth can be positioned during the grinding of the front edge thereof, and independently acting means to cause the other one of said clamp arms to press downwardly on an adjacent link.

References Cited in the file of this patent

UNITED STATES PATENTS

| | | |
|---|---|---|
| 1,874,315 | Laurent | Aug. 30, 1932 |
| 2,318,456 | Blum | May 4, 1943 |
| 2,410,828 | Lofstrand, Jr. | Nov. 12, 1946 |

FOREIGN PATENTS

| | | |
|---|---|---|
| 455,128 | Canada | Mar. 15, 1949 |